Patented Oct. 19, 1948

2,451,963

UNITED STATES PATENT OFFICE 2,451,963

ISOCYANATES OF HYDROLYZED ETHYLENE VINYL ESTER INTERPOLYMERS

Donald John Loder, Wilmington, Del., assignor to E. I. du Pont de Nemours & Company, Wilmington, Del., a corporation of Delaware No Drawing. Application February 4, 1944, Serial No. 521,135

28 Claims. (Cl. 260—86)

This invention relates to a process for the preparation of new rubber-like compositions of matter, and more particularly to their preparation from an isocyanate, an interpolymer of ethylene and an organic acid ester of vinyl alcohol.

In the U. S. patent of J. R. Roland, Jr., 2,386,347, filed February 13, 1945, as a continuation of application S. N. 446,114, filed June 6, 1942, there is described a process for the hydrolysis of interpolymers of ethylene and organic acid esters of vinyl alcohol. The process of the patent is conducted by hydrolyzing the ethylene-organic vinyl ester interpolymer by dissolving it in a suitable solvent, such as methanol, or ethanol, or in a mixture of an alcohol and a hydrocarbon such as toluene, and then treating the resulting solution with a hydrolyzing agent or catalyst such as an alkali or mineral acid. The process described by Roland likewise includes alcoholysis as well as hydrolysis either water or alcohol being employed to split the ester groups from the interpolymer; in either event the resulting product is substantially the same. The products of the Roland patent or similar products obtained in accord with any suitable process are further treated by the processes of this invention.

An object of the present invention is to provide valuable new compositions of matter. Another object is to provide a process for converting partially or completely the hydrolyzed interpolymers of ethylene and vinyl esters to new compositions of matter. A further object of the invention is to provide a process for the interaction of a hydrolyzed interpolymer of ethylene and vinyl acetate with an alkyl or aryl ester of isocyanic acid. Yet another object is to provide optimum conditions for conducting such a process. Still another object is to provide products that can be converted to fibers, films, adhesives, and rubberlike compositions. Other objects and advantages of the invention will hereinafter appear.

The above objects are realized in accord with the invention by subjecting to a reaction with an alkyl or aryl isocyanic acid ester a partially or completely hydrolyzed interpolymer of ethylene and an organic acid ester of vinyl alcohol, or a similar product produced by any process such, for example, as those processes producing synthetic resins which contain free hydroxyl groups and more particularly such resins as the polyvinyl alcohols, polymers obtained from the hydrolyzed interpolymers of vinyl acetate and vinyl chloride, polymers of allyl alcohol, and the like. The reaction may be conducted by dissolving the interpolymer and the isocyanate in a suitable mutual solvent, i. e. a solvent for the interpolymer and the isocyanate, and subsequently effecting the reaction between the interpolymer and the isocyanate by heating. The products which are formed, it is believed, by the addition of the isocyanate to the hydroxyl group of the hydrolyzed interpolymer may be called N-alkyl or N-aryl carbamates of the hydrolyzed interpolymer of ethylene and a vinyl ester.

The interpolymers which may be used in the process of this invention include all of the interpolymers of ethylene with organic acid esters of vinyl alcohol. Specific examples of these interpolymers include the interpolymers of ethylene and vinyl acetate, propionate, butyrate, and the higher straight and branch chain aliphatic organic acids. Interpolymers may likewise be employed which contain ethylene and vinyl esters of the aromatic organic acids. The ratio of ethylene to the vinyl ester may vary over a wide range, but those interpolymers containing from 1 to 15 moles of ethylene per mole of the vinyl ester are preferred. Any suitable hydrolysis or alcoholysis process may be employed for splitting off the ester groups from the interpolymers such as the process of the Roland application, supra. It is not essential to the operability of the process that all of the ester groups be split from the interpolymer, although for optimum results at least 50% thereof should be removed, and all may be removed if desired.

The alkyl isocyanates that may be employed include particularly the lower alkyl isocyanates, such for example, as methyl, ethyl, normal and isopropyl, normal and isobutyl, although the higher straight and branch chain alkyl esters as well as the aryl esters of the isocyanic acid may also be used such as the phenyl and naphthenyl isocyanates.

The reaction is initiated preferably in the presence of about one mole of the isocyanate per equivalent interpolymer hydroxyl group although desirable products can be obtained with from 0.5 to 5.0 moles of the isocyanate per equivalent of the interpolymer hydroxyl group.

The reaction is conducted between approximately 50 and 200° C., and is preferably carried out at about 100° C. and 1 atmosphere pressure. The reaction, however, may, if desired, be conducted under sub-, normal- or superatmospheric pressures. The duration of the reaction is not particularly critical, for valuable products having desirable film-forming properties can be obtained from reactions extending from in the order of ¼ to 10 hours at temperatures in the proximity of 90° C. Generally several hours are required for complete reaction but it is not necessary that all the hydroxyl present react. Excellent fibers can be formed from resins in which only from 10 to 20% of the hydroxyl groups are converted to N-alkyl carbamate groups.

Various solvents may be employed for effecting the reaction, and those selected are preferably mutual solvents for both the interpolymer and the isocyanate. Examples of such solvents include dioxane, 1,3-dioxolanes, formamide and dimethyl formamide.

The products of the reaction are isolated by precipitation from the solvent, which may be accomplished by the addition of water. Any solvent remaining in the resin is removed by subjecting the precipitate to the action of steam. The thus precipitated polymer may be then milled at temperatures between 30 and 150° C. in order to render it dry and homogeneous.

Examples are given which disclose specific embodiments of the invention in which proportions are by weight unless otherwise indicated.

*Example 1.*—A reaction vessel was charged with 10 parts of a hydrolyzed interpolymer of ethylene and vinyl acetate, (in which the ethylene : vinyl acetate ratio equalled 8:1) together with 10 parts of ethyl isocyanate and 240 parts of dioxane. The resulting mixture was heated on a steam bath to a temperature of 90° C. and under a pressure of approximately 1 atmosphere for ½ hour. The dioxane was removed by steam distillation, and the residue precipitated with water, filtered, and subsequently milled for 15 minutes in a rubber mill at 100° C. A clear, very stiff, and tough product was obtained, which could be melt-spun into fine fibers. A film of this resin prepared by processing a portion of the product between platens at 135° C. had a tensile strength based on original dimensions of approximately 3500 lbs. per square inch with an elongation of approximately 800%.

The above process was repeated, except that the reaction time was approximately 1 hour. In this instance a film was obtained having a tensile strength of approximately 4350 lbs. per square inch, with an elongation of approximately 800%.

*Example 2.*—A reaction vessel was charged with 5 parts of a hydrolyzed interpolymer of ethylene and vinyl acetate (in which the ratio of ethylene : vinyl acetate was 2:1), 5 parts of hydrolyzed interpolymer of ethylene and vinyl acetate (in which the ethylene : vinyl acetate was 2.1:1), 200 parts of dioxane, and 7 parts of ethyl isocyanate. The reaction was conducted at 90° C. and 1 atmosphere for approximately 5 hours, the dioxane was removed by steam distillation, and the product then milled for 20 minutes at a temperature between 30 and 100° C. The final product had a clear amber color, was very tough and stiff, and was hot-drawn from a melt to an extra-fine and very smooth fiber. The tensile strength of a fiber was 4900 lbs. per square inch, with an elongation of 350%, and a recovery to 130%. The resinous product contained 4.8% nitrogen, which corresponds to about 46% of the hydroxyl groups initially present substituted by N-ethyl carbamate groups.

*Example 3.*—A reaction vessel was charged with 2 parts of an interpolymer of ethylene and vinyl acetate (in which the ratio of ethylene : vinyl acetate was 1.6:1) 200 parts of dioxane, and 2 parts of ethyl isocyanate. The mixture was heated on a steam bath while being irradiated with a mercury vapor H$_4$ lamp, and maintained at a temperature of approximately 90° C. for about 15 minutes. The resulting product was steam distilled for the removal of the dioxane, precipitated with water and milled for 10 minutes at a temperature between 70 and 80° C. A clear, tough, stiff product was obtained, which could be heat-drawn into a very fine fiber. The tensile strength of the product was 3350 lbs. per square inch with an elongation of about 400% and a retraction to about 100%.

*Example 4.*—A hydrolyzed ethylene-vinyl acetate interpolymer having an ethylene : vinyl acetate ratio of 1.8:1 was converted to the N-ethyl carbamate by the method described in Example 2. The resulting resin was pressed into a film at 140° C. The film prepared in this manner had a tensile strength of 6000 lbs. per square inch, with an elongation of 450%, and a recovery to 400%. An imperfect hand-drawn fiber, prepared by melting a strip of the film, and drawing the resin while molten to 238 denier had a strength of 1.9 grams per denier.

The process of Example 1 was duplicated in the examples illustrated in Table I except for conditions as noted.

*Table I*

| Example No. | 5 | 6 | 7 | 8 | 9 |
|---|---|---|---|---|---|
| Ratio E/VA [1] | 3 | 1.6 | 2.2 | 1.8 | 2.2. |
| Amt. E/VA (parts) | 10 | 2 | 10 | 10 | 3. |
| Solvent | dioxane | dioxane | dioxane | dioxane | dioxane. |
| Solvent (parts) | 200 | 200 | 100 | 300 | 100. |
| Isocyanate (alkyl) | phenyl | ethyl | methyl | phenyl | isobutyl. |
| Isocyanate (parts) | 10.5 | 2 | 7 | 11 | 3. |
| Temp. (° C.) | 80 | 90 | 90 | 90-100 | 90-100. |
| Pressure (atms.) | 1 | 1 | 1 | 1 | 1. |
| Time (hrs.) | 3.5 | ¼ | 8 | 6 | 3. |
| Milled (min.) | 20 | 10 | 45 | 15 | 15. |
| Milled (Temp., ° C.) | 30-100 | 70-80 | 30-100 | 100 | 100. |
| Properties: | | | | | |
| Tensile (p. s. i.) | 3300 | 3350 | 3750 | 4750 | 2700. |
| Elongation | 100% | 300 | 400 | Ca. 15 | 400. |
| Recovery to | 0% | 40 | 80 | | 50. |

[1] Ethylene-vinyl acetate interpolymer.

The interpolymers employed in the above examples were hydrolyzed by treating a benzene solution of the interpolymer with a methanol solution of sodium hydroxide at a temperature of approximately 30° C. for 4 hours.

The products of the invention can be modified by reaction with aldehydes or acetals to give valuable thermosetting resins including elastomers and adhesives which reactions result in the formation of cross linkages within the molecule. Such treatments may be carried out, for example, by heating the products prepared above to a temperature between 20 and 80° C. for from about 5 to about 30 minutes in the presence of an amount of aldehyde or acetal approximately equal, on a stoichiometrical weight basis, to the N-alkyl carbamate substituents present. Formalin may be used in lieu of formaldehyde which may, if desired, be replaced by methylal, methoxymethoxy ethanol, or the like, the reaction preferably being carried out in an alcoholic solution at a pH lower than 7. Upon evaporation of the alcoholic solvent a resinous product is obtained having excellent adhesive properties. Adhesive bonds formed with these thermosetting resins may be hardened by heat treatment at temperatures between 100 and 150° C. whereby a water insoluble bond is made that is resistant to both hot and cold water. These thermosetting resins may be modified if desired by mixture with dimethylol urea, urea-formaldehyde resins, phenol-formaldehyde resins, melamine resins and the like. Ordinarily however the resins obtained by simple treatment with formaldehyde impart adequate strength to bond materials together.

The examples which follow illustrate the type of products obtained by treating the N-ethyl alkyl or N-aryl carbamates of hydrolyzed interpolymers disclosed above with cross-linking agents.

porting and adhesive layer of laminated glass or in the lamination of paper, regenerated cellulose, textiles, wood, metals, and the like.

I claim:

1. A process which comprises subjecting a solution of a hydrolyzed interpolymer of ethylene and vinyl acetate in dioxane to a temperature between 30 and 200° C. with an alkyl isocyanate there being present from 0.5 to 5.0 moles of the alkyl isocyanate per equivalent of hydroxyl in the polymer.

2. A process which comprises subjecting a hydrolyzed interpolymer of ethylene and vinyl acetate to a temperature between 30° and 200° C. with ethyl isocyanate there being present from 0.5 to 5.0 moles of ethyl isocyanate per equivalent of hydroxyl in the interpolymer.

3. A process which comprises subjecting a hydrolyzer interpolymer of ethylene and vinyl acetate to a temperature between 30° and 200° C. with methyl isocyanate there being present from 0.5 to 5.0 moles of methyl isocyanate per equivalent of hydroxyl in the interpolymer.

| Example | E/VA Ratio | Per Cent N | Compounding 100 pts. Polymer plus pts. | Cure | | Tensile, p. s. i. | Per Cent Elong. | | 300% Mod. | 100% Mod. |
|---|---|---|---|---|---|---|---|---|---|---|
| | | | | Min. | ° C. | | Ultimate | Rec. to— | | |
| 10 | 1.8 | 2.2 | None | 20 | 135 | 2,400 | 325 | 40 | 2,350 | 2,050 |
| 11 | 1.8 | 2.2 | 5 paraformaldehyde | 20 | 135 | 3,200 | 300 | 30 | 3,200 | 1,100 |
| 12 | 1.8 | 2.2 | 10 paraformaldehyde | 20 | 135 | 3,400 | 270 | 25 | | 800 |
| 13 | 1.8 | 2.2 | ...do | 30 | 135 | 3,400 | 250 | 19 | | 800 |
| 14 | 1.8 | 6.7 | None | 20 | 135 | 2,750 | 350 | 50 | 2,400 | 1,500 |
| 15 | 1.8 | 6.7 | 10 paraformaldehyde | 30 | 135 | 1,950 | 350 | 25 | 950 | 100 |
| 16 | 1.8 | 6.7 | 20 C, 10 paraformaldehyde | 3 | 135 | 2,500 | 300 | 50 | 2,500 | 1,350 |
| 17 | 1.8 | 2.35 | 10 paraformaldehyde | 3 | 135 | 3,200 | 50 | 0 | | |
| 18 | 2.1 | 1.84 | ...do | 20 | 135 | 3,300 | 350 | 60 | 1,750 | 600 |
| 19 | 4.3 | 1.8 | ...do | 30 | 135 | 3,000 | 410 | 170 | 1,200 | 600 |
| 20 | 1.7 | 5.0 | ...do | 60 | 135 | 1,050 | 200 | 5 | | 350 |
| 21 | 1.7 | 5.0 | 25 DMU, 1 NH₄Cl | 30 | 135 | 3,100 | 25 | 0 | | |
| 22 | 1.8 | 5.1 | 10 paraformaldehyde | 30 | 135 | 2,700 | 350 | 75 | 2,150 | 700 |
| 23 | 1.8 | 5.1 | 10 paraformaldehyde 5 CaO | 30 | 135 | 2,400 | 350 | 80 | 2,050 | 700 |
| 24 | 1.8 | 5.1 | 10 paraformaldehyde 5 St | 30 | 135 | 2,450 | 200 | 25 | | 750 |
| 25 | 1.8 | 5.1 | 10 DMU, 1 NH₄Cl | 30 | 135 | 4,550 | 100 | 18 | | 4,550 |
| 26 | 1.8 | 5.1 | ...do | 15 | 135 | 4,100 | 150 | 15 | | 2,450 |
| 27 | 1.6 | 2.0 | 10 paraformaldehyde | 30 | 135 | 3,550 | 385 | 105 | 2,400 | 1,100 |
| 28 | 1.6 | 2.0 | ...do | 20 | 135 | 2,100 | 310 | 75 | 2,000 | 850 |
| 29 | 1.6 | 2.0 | 10 methoxy methyl uron, 1 NH₄Cl | 30 | 135 | 2,100 | 150 | 25 | | 1,300 |
| 30 | 1.6 | 2.0 | 10 bis methoxy methyl urea, 1 NH₄Cl | 60 | 135 | 3,350 | 200 | 45 | | 1,450 |

Examples 10 to 17 and 19 to 30 were N-ethyl carbamate and Example 18 N-phenyl carbamate of E/VA
C = channel black carbon.
St = stearic acid.
DMU = dimethylol urea.

The unmodified products of this invention are particularly well adapted to the preparation of filaments or films which can be formed by dry spinning or forming or hot melt spinning or forming; in the former the product is dissolved in a suitable solvent, and then forced through a suitable orifice into a heated chamber wherein the solvent is removed from the formed product, and in the latter the product is heated to substantially its melting point and drawn into a filament or film at a sufficiently rapid rate to give the desired denier or thickness respectively. After stretching, and heat setting of the fibers the properties are improved for many uses.

The products both with and without cross linking agents are likewise suitable for use in the plastic arts, for the preparation of sheets, molded articles, and other fabricated shapes. These may vary from hard rigid products to soft elastic or soft plastic materials depending on the nature of the resin employed and the nature and quantity of pigments, fillers, plasticizers and curing agents added and the curing or molding cycle employed.

The products of this invention afford very useful coating compositions and unsupported films. They are particularly attractive as coating agents for fabrics. The films may be used as the sup- 4. A process which comprises subjecting a hydrolyzed interpolymer of ethylene and vinyl acetate to a temperature between 30° and 200° C. with phenyl isocyanate there being present from 0.5 to 5.0 moles of phenyl isocyanate per equivalent of hydroxyl in the interpolymer.

5. An N-alkyl carbamate of a hydrolyzed interpolymer of ethylene and vinyl acetate.

6. An N-ethyl carbamate of a hydrolyzed interpolymer of ethylene and vinyl acetate.

7. An N-phenyl carbamate of a hydrolyzed interpolymer of ethylene and vinyl acetate.

8. An N-methyl carbamate of a hydrolyzed interpolymer of ethylene and vinyl acetate.

9. A process which comprises heating an N-alkyl carbamate of a hydrolyzed interpolymer of ethylene and vinyl acetate with a compound selected from the group consisting of formaldehyde, methylol, and methoxy-methoxy ethanol.

10. A process which comprises subjecting N-ethyl carbamate of a hydrolyzed interpolymer of ethylene and vinyl acetate to a reaction with formaldehyde at a temperature between 20 and 80° C.

11. The product in accord with the process of claim 10.

12. A process for the preparation of an N-substituted carbamate of a hydrolyzed interpolymer of ethylene and vinyl acetate containing from 1 to 15 moles of ethylene per mole of vinyl acetate, which comprises subjecting such an interpolymer of ethylene and vinyl acetate, which has been hydrolyzed, to a reaction with from 0.5 to 5.0 moles of an alkyl isocyanate per mole of the interpolymer, the reaction being affected at a temperature between 30 and 200° C.

13. A process for the preparation of an N-substituted carbamate of a hydrolyzed interpolymer of ethylene and vinyl acetate which comprises heating a hydrolyzed interpolymer of ethylene and vinyl acetate with an alkyl isocyanate, there being present from 0.5 to 5.0 moles of the alkyl isocyanate per equivalent of hydroxyl in the interpolymer.

14. A process for the preparation of an N-substituted carbamate of a hydrolyzer interpolymer of ethylene and a vinyl ester of an organic monocarboxylic acid which comprises heating a hydrolyzed interpolymer of ethylene and a vinyl ester of an aliphatic saturated organic monocarboxylic acid with a mono ester of monoisocyanic acid at a temperature between 30 and 200° C.

15. The process of claim 14 conducted at a temperature between 50 and 200° C.

16. The process of claim 14 in which the isocyanate is an alkyl isocyanate.

17. The process of claim 14 in which the isocyanate is an aryl isocyanate.

18. The process of claim 14 conducted in a mutual solvent for the hydrolyzed interpolymer and the isocyanate.

19. A process for the preparation of an N-substituted carbamate of a hydrolyzed interpolymer of ethylene and vinyl acetate which comprises heating a hydrolyzed interpolymer of ethylene and a vinyl acetate with a mono ester of monoisocyanic acid at a temperature between 30 and 200° C.

20. The process of claim 19 in which the isocyanate is an alkyl isocyanate.

21. The process of claim 19 in which the isocyanate is an aryl isocyanate.

22. A process which comprises subjecting ethyl isocyanate and a partially hydrolyzed interpolymer of ethylene and a vinyl ester of an aliphatic saturated organic monocarboxylic acid to a temperature between 30 and 200° C., there being present from 0.5 to 5.0 moles of the isocyanate per equivalent of hydroxyl in the interpolymer.

23. A process which comprises subjecting methyl isocyanate and a partially hydrolyzed interpolymer of ethylene and a vinyl ester of an aliphatic saturated organic monocarboxylic acid to a temperature between 30 and 200° C.

24. A process which comprises subjecting phenyl isocyanate and a partially hydrolyzed interpolymer of ethylene and a vinyl ester of an aliphatic saturated organic monocarboxylic acid to a temperature between 30 and 200° C.

25. An N-substituted carbamate of a hydrolyzed interpolymer of ethylene and a vinyl ester of an organic monocarboxylic acid.

26. A process which comprises subjecting an N-substituted carbamate of a hydrolyzed interpolymer of ethylene and a vinyl ester of an aliphatic saturated organic monocarboxylic acid to a temperature between 20 and 80° C. with a compound of the group consisting of formaldehyde, methylal and methoxymethoxyethanol.

27. A product in accord with the process of claim 26.

28. The product obtained in accord with the process of claim 26 which product is hardened by heating to a temperature between 100 and 150° C.

DONALD JOHN LODER.

REFERENCES CITED

The following references are of record in the file of this patent:

UNITED STATES PATENTS

| Number | Name | Date |
|---|---|---|
| 2,273,083 | Dorough | Mar. 24, 1942 |